United States Patent [19]
Petersen et al.

[11] Patent Number: 5,809,023
[45] Date of Patent: Sep. 15, 1998

[54] ATM METHOD AND APPARATUS UTILIZING DECOUPLING MINICELLS

[75] Inventors: Lars-Göran Petersen, Tumba; Lars Göran Wilhelm Eneroth, Tyresö, both of Sweden

[73] Assignee: Telefonaktiebolaget LM Ericsson, Stockholm, Sweden

[21] Appl. No.: 651,909

[22] Filed: May 21, 1996

[51] Int. Cl.⁶ .................................................. H04J 3/24
[52] U.S. Cl. ........................ 370/395; 370/336; 370/465
[58] Field of Search ...................... 370/395, 465, 370/470, 472, 474, 476, 477, 419, 326, 336, 349

[56] References Cited

U.S. PATENT DOCUMENTS

| | | | |
|---|---|---|---|
| 5,282,207 | 1/1994 | Jurkevich et al. | 370/477 |
| 5,457,684 | 10/1995 | Bharucha et al. | 370/395 |
| 5,490,140 | 2/1996 | Abensour et al. | 370/419 |
| 5,568,482 | 10/1996 | Li et al. | 370/395 |
| 5,568,486 | 10/1996 | Huscroft et al. | 370/395 |

FOREIGN PATENT DOCUMENTS 0 708 576 a2  4/1996  European Pat. Off.  ....... H04Q 11/04

OTHER PUBLICATIONS

William O. Covington, Jr. et al., "Voice Transport on an ATM Broadband Network", Communications Technology for the 1990's and Beyond, Dallas, Nov. 27–30, 1989, vol. 3 of 3, pp. 1921–1925.

*Primary Examiner*—Douglas W. Olms
*Assistant Examiner*—Shick Hom
*Attorney, Agent, or Firm*—Burns, Doane, Swecker & Mathis, L.L.P.

[57] ABSTRACT

When using asynchronous transfer mode (ATM) in low bit rate applications, such as cellular voice communication, bandwidth utilization is significantly improved by employing decoupling minicells. Decoupling minicells are of predetermined length, such as one octet, and are inserted into the payload of ATM cells when there is a delay in the availability of assigned minicells. As soon as an assigned minicell, which contains actual user data, becomes available, the assigned minicell can be inserted into the payload of the current ATM cell immediately after the last decoupling minicell. Unlike prior methods, there is no need to wait until the next ATM cell to insert an assigned minicell.

26 Claims, 11 Drawing Sheets

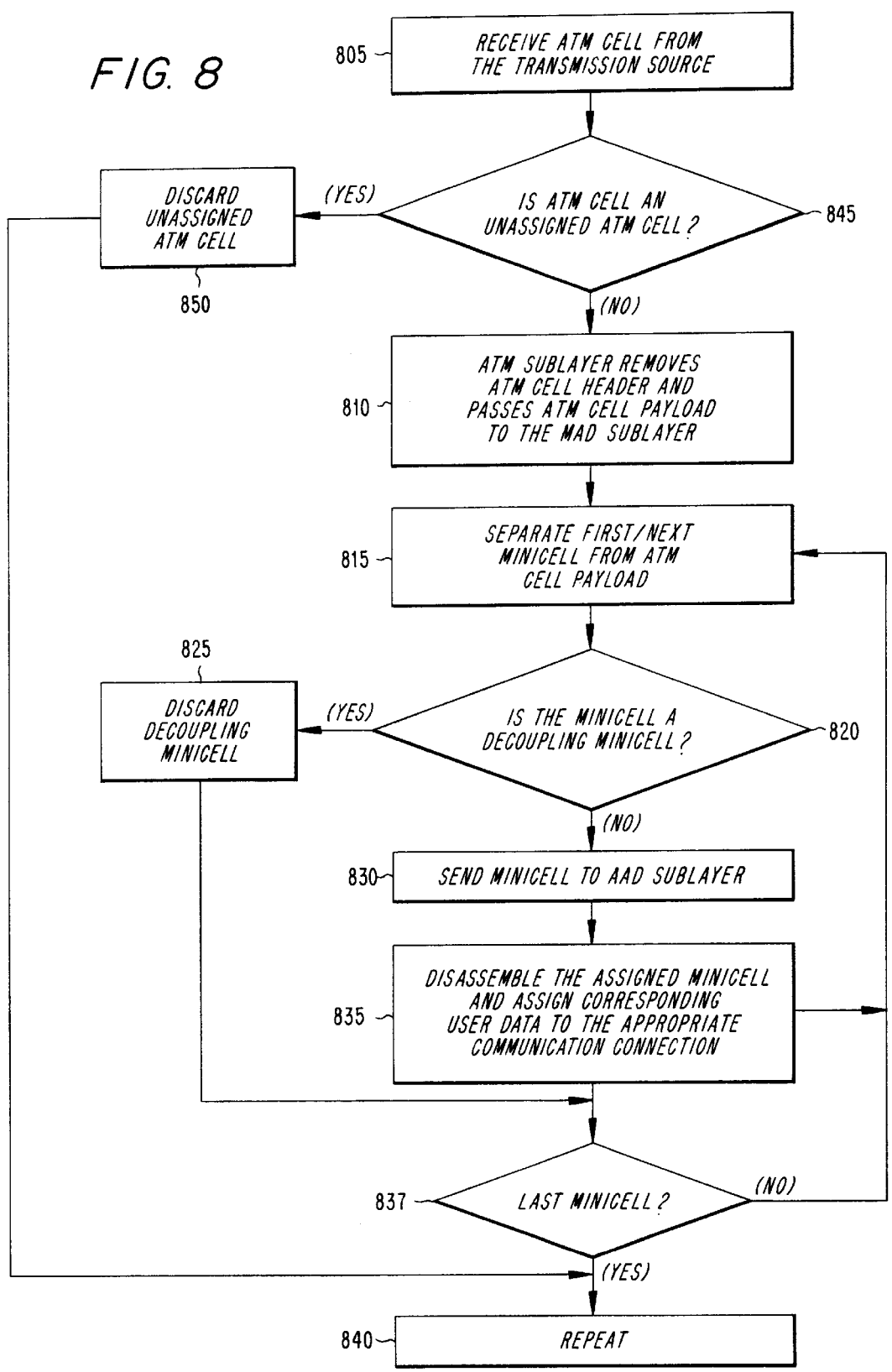

ATM METHOD AND APPARATUS UTILIZING DECOUPLING MINICELLS

BACKGROUND

The present invention relates to the transmission of telecommunication data using an asynchronous transfer mode (ATM) protocol. More specifically, the present invention relates to a method and apparatus for efficiently filling unused portions of each ATM cell to significantly minimize data transmission delays.

ATM is a standard protocol for transmitting asynchronous telecommunication data within a telecommunication system (e.g., a cellular telephone system). This protocol is based on the transmission of data in fixed size cells known as ATM cells. Each ATM cell has a 48 octet payload and a 5 octet header. In general, ATM is well known in the art.

ATM can be used for most low bit rate applications (e.g., cellular voice communication). However, when used for low bit rate applications, ATM does not efficiently utilize bandwidth, and bandwidth is very expensive. To illustrate, voice data from each communication channel is compressed into data packets. Each data packet is then stored in the payload of an ATM cell and the ATM cell is transported from a sending source (e.g., a base station) to a receiving entity (e.g., a mobile switching center). While each data packet ranges in length from a few octets to about 20 octets, the length of the ATM cell payload, as mentioned above, is 48 octets. Since each ATM cell carries but one data packet, a substantial portion of the ATM cell payload remains empty during transmission which is extremely inefficient.

To improve ATM bandwidth utilization, the ATM adaption layer 100 (AALm) was introduced, as illustrated in FIG. 1. The AALm 100 has two primary sublayers: the assembly and disassembly sublayer 102 (AAD) and the multiplexing and demultiplexing sublayer 103 (MAD). The AALm 100 operates as follows. The AAD sublayer 102 compresses voice data (and other types of related data) from each channel into relatively small data packets called minicells at a telecommunication system sending entity (e.g., a base station). The MAD sublayer 103 then multiplexes as many minicells as possible into the payload of each ATM cell before the sending entity transmits the ATM cell. At the receiving entity, the MAD sublayer 103 demultiplexes (i.e., separates) the minicells and the AAD sublayer 102 extracts the voice data from the minicells. Since each ATM cell is now capable of transporting more than one data packet (i.e., more than one minicell) at a time, bandwidth utilization is improved.

FIG. 2 illustrates a prior method and/or apparatus for transporting cellular data, such as voice data, using ATM with the AALm 100 described above. At a transmission source 200, voice data from communication channels 1 . . . n (not shown) is presented to the AAD sublayer 102 by the application layer 104. In the AAD sublayer 102, there is a corresponding one of the assembly functions $201_1$ through $201_n$ for each channel 1 . . . n. Each assembly function $201_1$ through $201_n$ represents a separate parallel process in which voice data (and other types of related data) from each channel 1 . . . n is compressed into minicells. The assembled minicells are then presented to the MAD sublayer 103, wherein multiplexer 203 takes each minicell and concatenates them, back-to-back, to form the payloads of ATM cells. If for any reason the AAD sublayer 102 delays the presentation of minicells to the MAD sublayer 103, multiplexer 203 automatically fills the remaining portion of the current ATM cell payload with a padding minicell. A padding minicell does not contain any useful data, but is instead utilized merely to occupy space in the ATM cell payload. Once the ATM cell payload is filled, it is presented to the ATM layer 101. ATM layer 101 then generates an ATM cell header, attaches the header to the ATM cell payload, and transmits the ATM cell, header and payload, via communication link 207, to a telecommunication system receiving entity 220.

If the delay in presenting minicells to the MAD sublayer 103 is substantial, as is often the case during off-peak periods, an ATM cell generator 205 in the ATM layer 101 will generate an unassigned ATM cell (i.e., one whose payload contains no minicells). The unassigned ATM cell will then be multiplexed into the ATM cell stream by multiplexer 206 and transmitted to the receiving entity 220 via communication link 207 in order to maintain the ATM cell stream.

At the receiving entity 220, each ATM cell is presented to the ATM layer 101, wherein demultiplexer 208 distinguishes between unassigned ATM cells and ATM cells carrying minicells. Unassigned ATM cells are discarded as illustrated by "wastebasket" 209. If the ATM cell is carrying minicells, the ATM layer 101 removes the header from the ATM cell and presents the payload portion of the ATM cell to the MAD sublayer 103, wherein demultiplexer 211 distinguishes between padding minicells and minicells carrying data. Padding minicells are discarded (not shown) and minicells carrying data are separated by channel and presented to the corresponding disassembly function $213_1$ to $213_n$ in the AAD sublayer 102. The disassembly functions $213_1$ through $213_n$ extract the voice data from each minicell and present it to the application layer 104.

FIG. 3 illustrates a well known protocol for minicell 301. Minicell 301 is divided into a header 302 and a payload 303 much like an ATM cell. The header is, in general, divided into the following fields: a circuit (channel) identifier (CID) code 304, a length code 305, and a header integrity check (HIC) code 306. The CID code 304 provides the information needed to associate each minicell with its corresponding channel. The length code 305 provides the information needed to determine the location of the first and last octet of each minicell. The CID code 304 and the length code 305 together make it possible for a plurality of minicells, each corresponding to a different channel, to be carried by a single ATM cell. The CID code 304 and the length code 305 also provide ample means for demultiplexing (i.e., separating) the minicells in the AAD sublayer 102 at the receiving entity 220, as long as the minicells are continuously connected back-to-back, as mentioned above.

FIG. 4 depicts an ATM cell stream, constructed in accordance with the method and/or apparatus of FIG. 2, as a function of time. In FIG. 4, time runs according to the arrow 401. Minicells 403, 404, 405, and 407 arrive at the MAD sublayer 103 at various points in time. Each ATM cell 415 through 419 comprises a header and a payload portion, for example, ATM cell header 420 and ATM cell payload 421 corresponding to ATM cell 418.

To begin, minicell 403 is multiplexed into the payload of ATM cell 416 by the MAD sublayer 103. Because there is a delay between the arrival of minicell 403 and minicell 404 at the MAD sublayer 103, the MAD sublayer 103 must insert a padding minicell 409 after minicell 403 to completely fill the remainder of the ATM cell 416 payload. Despite the fact that minicells 404 and 405 arrive at the MAD sublayer 103 before the ATM cell 416 is transmitted by ATM sublayer 101, minicells 404 and 405 are multiplexed into the payload of the next available ATM cell 417. Because of the delay between the availability of minicell 405 and minicell 407, the MAD sublayer 103 must insert a padding minicell 410 after minicell 405 to fill the remainder of the ATM cell 417 payload. Moreover, minicell 407 is not completely available when the MAD sublayer 103 begins constructing the payload of ATM cell 418; therefore, the MAD sublayer 103 must wait until it begins constructing the payload of ATM cell 419 to insert minicell 407.

FIG. 4 does show that the use of ATM with the AALm 100 sublayer improves ATM bandwidth utilization in low bit rate applications. For example, the payload of ATM cell 417 is carrying three separate minicells; therefore, less of the payload is being wasted. However, FIG. 4 also shows that ATM, even with AALm 100 still wastes a significant portion of the bandwidth, as illustrated by those portions of the ATM cells filled by padding minicell 409 and padding minicell 410. To illustrate just how inefficient ATM is with respect to bandwidth utilization, even with the AALm 100 described above, a 53 octet ATM cell carrying no data (i.e., an unassigned ATM cell), for example, ATM cell 418, represents 6–7 msec worth of wasted bandwidth. Each padding minicell represents an additional amount of wasted bandwidth.

If ATM with AALm 100 is to be used for low bit rate applications, such as cellular voice communication, there is a need to minimize the inefficient utilization of bandwidth by reducing the size of unused portions of ATM cell payloads, especially when data is available.

SUMMARY

It is an object of the present invention to minimize data transmission delays when using the ATM protocol for low bit rate applications, such as cellular voice communication.

It is also an object of the present invention to provide improved bandwidth utilization when using the ATM protocol for low bit rate applications, such as cellular voice communication.

It is another object of the present invention to minimize data transmission delays and to provide improved bandwidth utilization by filling the payload of a current ATM cell with decoupling minicells, having a fixed length of one octet, during a period of time when user data is not available.

It is yet another object of the present invention to minimize data transmission delays and to provide improved bandwidth utilization by inserting minicells, containing actual user data, into the payload of a current ATM cell immediately upon becoming available.

In accordance with one aspect of the present invention, the foregoing and other objects are achieved by a method and an apparatus for constructing a data cell which carries user data from a transmission source to a receiving entity comprising the steps of generating at least one decoupling minicell if user data is not available, wherein the at least one decoupling minicell has a predetermined length; and constructing the data cell using the at least one decoupling minicell if user data is not available.

In accordance with another aspect of the present invention, the foregoing and other objects are achieved by a method and an apparatus for generating and transmitting a data cell which carries user data from a transmission source to a receiving entity comprising the steps of generating assigned minicells as long as user data is available and making the generated assigned minicells available for inclusion in the data cell; determining whether an assigned minicell is currently available, and if so, then inserting the assigned minicell into the data cell; generating decoupling minicells and then inserting the decoupling minicells into the data cell in place of assigned minicells if there are no assigned minicells currently available, wherein each decoupling minicell has a predetermined length; and transmitting the data cell when the data cell has been fully constructed.

In accordance with yet another aspect of the present invention, the foregoing and other objects are achieved by a method and an apparatus for extracting user data from a data cell which carries the user data from a transmission source to a receiving entity comprising the steps of separating at least one minicell from the data cell if the data cell is not an unassigned data cell; determining whether the at least one minicell is a decoupling minicell, wherein the at least one minicell has a predetermined length; discarding the at least one minicell if the minicell is a decoupling minicell; and removing the user data from the at least one minicell if the minicell is not a decoupling minicell.

BRIEF DESCRIPTION OF THE DRAWINGS

The objects and advantages of the invention will be understood by reading the following detailed description in conjunction with the drawings in which:

FIG. 8 is a flow chart depicting a method of receiving an ATM cell according to a second embodiment of the present invention;

DETAILED DESCRIPTION

Figure 5:
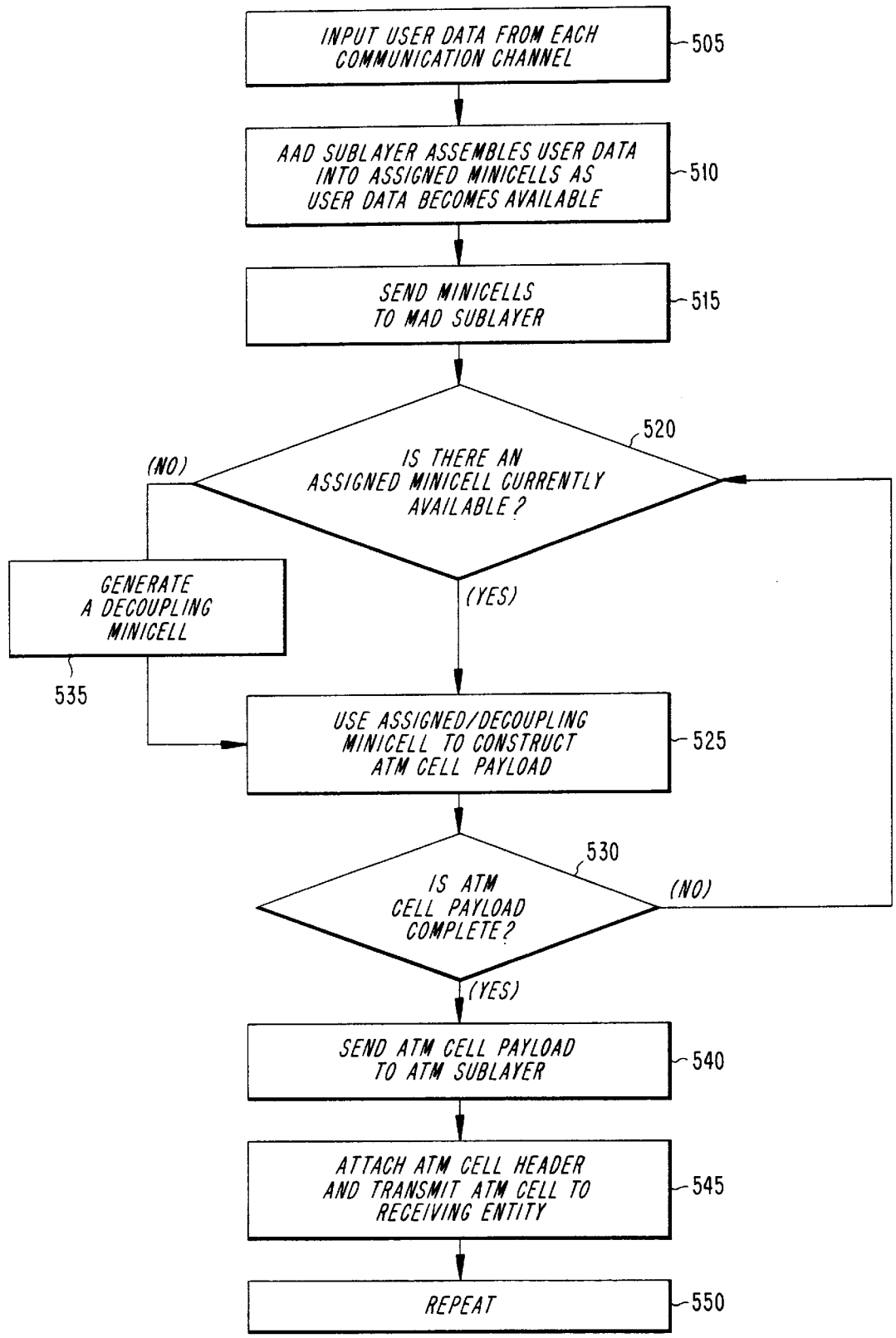
FIG. 5 is a flow chart depicting a method of constructing and transmitting an ATM cell according to a first embodiment of the present invention.

FIG. 5 is a flow chart depicting an exemplary embodiment of the present invention. In general, this embodiment provides a method for efficiently preparing and transmitting cellular telecommunication data, for example, cellular voice data, using the ATM protocol with an improved AALm sublayer. This method will now be described in greater detail hereinbelow.

First, bursts of user data (including voice data) arrive at a transmission source (e.g., a telecommunication base station) from each active, incoming communication channel, as illustrated by block 505. Second, the AAD sublayer 102, located in the transmission source, assembles each burst of user data, as it becomes available, by compressing the data into the payload portion of an assigned minicell, as illustrated in block 510. These minicells are referred to as assigned minicells because the AAD sublayer 102 "assigns" a burst of user data, corresponding to a particular communication channel, to each of these minicells. Third, the AAD sublayer 102 sends each assigned minicell to the MAD sublayer 103 immediately after they are assembled, as illustrated by block 515.

The MAD sublayer 103 is prepared to continuously receive assigned minicells from the AAD sublayer 102. As long as the assigned minicells arrive at the MAD sublayer 103 in an uninterrupted stream, the MAD sublayer 103 links them, back-to-back, to form the payload of the current ATM cell. The MAD sublayer 103 continues to link the assigned minicells so long as the AAD sublayer 102 continues to send assigned minicells without interruption or until the payload of the current ATM cell is full. This is illustrated by the combination of blocks 520, 525, and 530. However, if there is any time delay between the arrival of any two assigned minicells at the MAD sublayer 103, the MAD sublayer 103 will generate one or more decoupling minicells. Decoupling minicells are different than other minicells, such as assigned minicells and padding minicells. Decoupling minicells do not contain a header or a payload. Instead, they are data structures with a fixed, predefined length and bit pattern as will be illustrated in greater detail below. The MAD sublayer 103 then proceeds to use these decoupling minicells instead of assigned minicells (since none are currently available) to build the payload of the current ATM cell until the payload of the current ATM cell is full or until one or more assigned minicells become available from the AAD sublayer 102. This is illustrated by the combination of blocks 520, 535, 525, and 530.

Once the payload of the current ATM cell is completely filled, the MAD sublayer 103 passes the payload to the ATM layer 101, as illustrated by block 540. The ATM layer 101 attaches an ATM cell header to the payload, then the transmission source transmits the ATM cell, header and payload, to a receiving entity (e.g., a telecommunication mobile switching center), as shown in block 545. Since a continuous stream of ATM cells must be maintained in accordance with the ATM protocol, the method described above continuously repeats itself, as illustrated by block 550.

Figure 1:
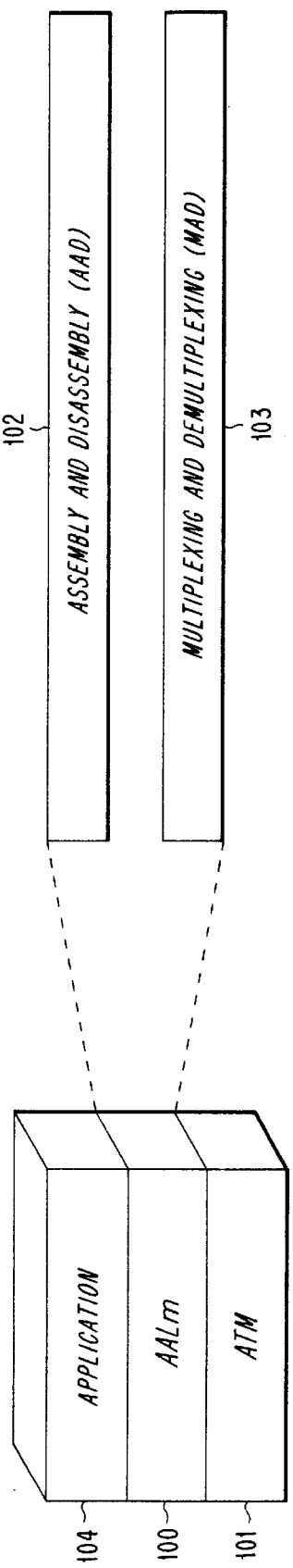
FIG. 1 is a diagram illustrating the primary sublayers or the Asynchronous Transfer Mode Adaption Layer.
Figure 2:
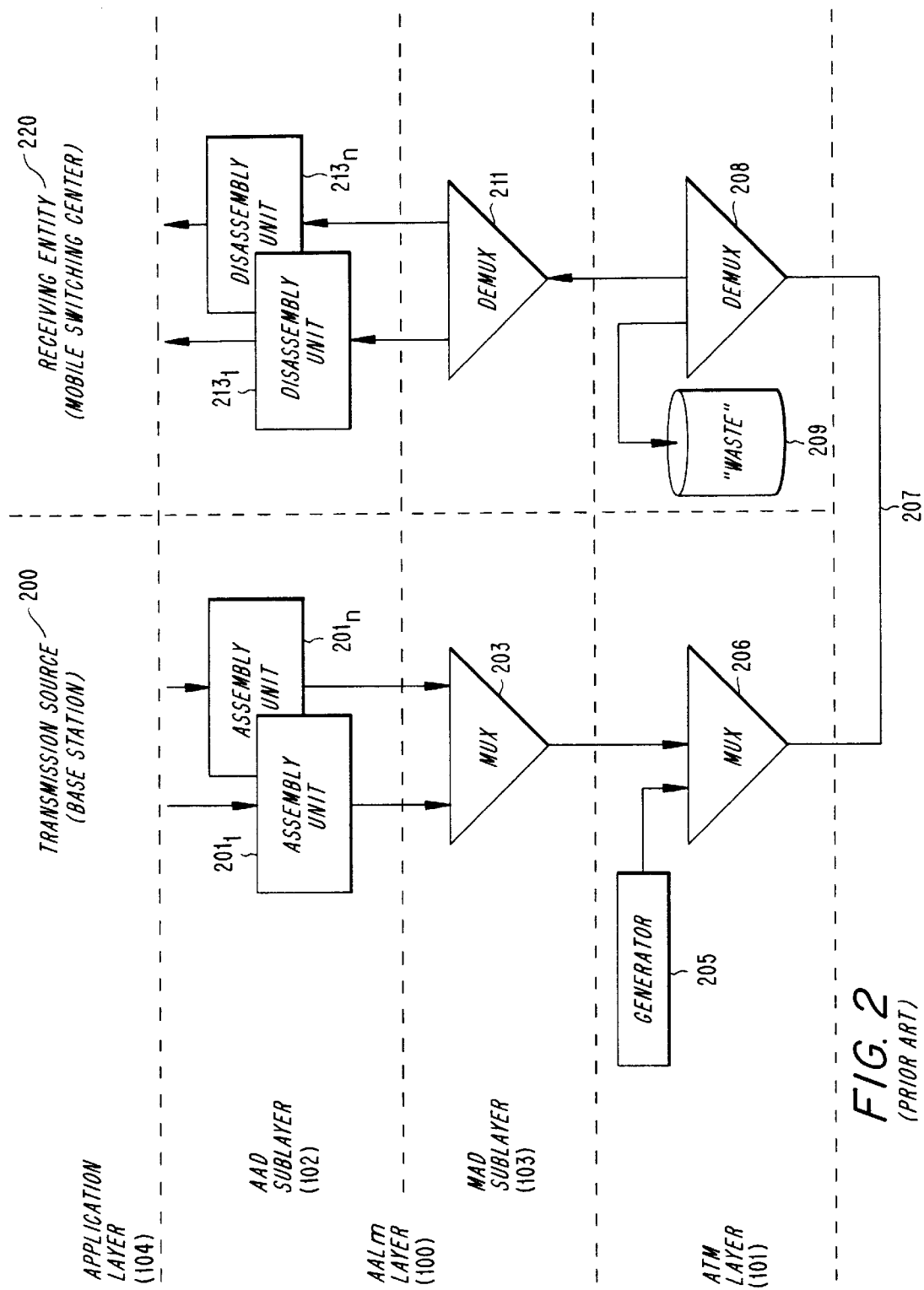
FIG. 2 is a block diagram of an apparatus for constructing, transmitting, and receiving ATM cells according to prior methods.
Figure 3:
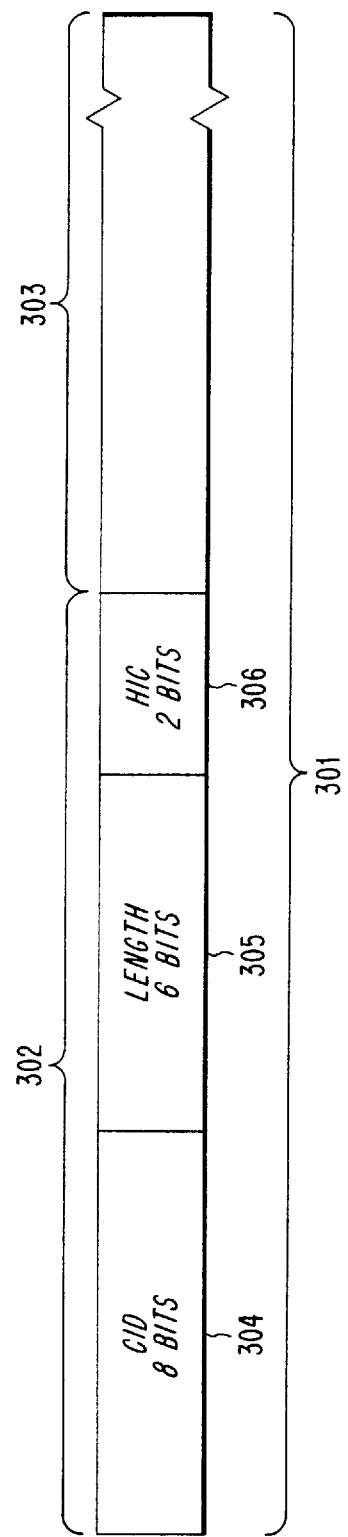
FIG. 3 shows a standard protocol for a minicell.
Figure 10:
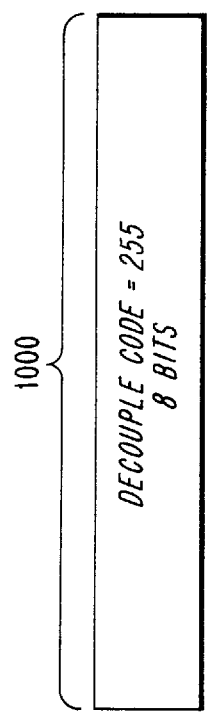
FIG. 10 shows an exemplary decouple code for the decoupling minicells.

In a preferred embodiment, each decoupling minicell might be one octet in length, as mentioned above. In order for detector 930 to distinguish decoupling minicells from assigned minicells, a special decouple code must be established. For example, a decouple code of 255 (11111111 in binary) might be used, as illustrated in FIG. 10. Of course, if a decouple code of 255 is set aside to distinguish decoupling minicells from assigned minicells, one skilled in the art will readily understand that in order to preserve minicell alignment, the first octet of assigned minicells should never be set equal to a value of 255.

In the event of single bit errors, minicell alignment may be further protected by defining a primary decouple code and a secondary set of decouple codes, in which there is a hamming distance of one between the primary decouple code value and each of the secondary decouple code values. For example, if the decimal value of the primary decouple code is 255 (i.e., 11111111 in binary), the secondary set of decouple codes would consist of the following decimal values: 254, 253, 251, 247, 239, 223, 191, and 127 (i.e., the binary values 11111110, 11111101, 11111011, 11110111, 11101111, 11011111, 10111111, and 01111111 respectively).

Furthermore, a decoder at the receiving entity would decode and identify the primary decouple code and each of the secondary decouple codes as a decoupling minicell. Again, one of skill in the art will readily understand that the first octet of any assigned minicells should not be set equal to any of the primary or secondary decouple code values to preserve minicell alignment.

As stated above, the length of each decoupling minicell in a preferred embodiment may be one octet. By minimizing the length of the decoupling minicells, the present invention improves bandwidth utilization by minimizing the time required to insert an assigned minicell into an ATM cell payload following a delay in the availability of assigned minicells. In other words, the MAD sublayer 103 no longer has to wait until the next ATM cell to insert an assigned minicell if the assigned minicell is presently available, as was the case in prior methods employing padding minicells.

Figure 6:
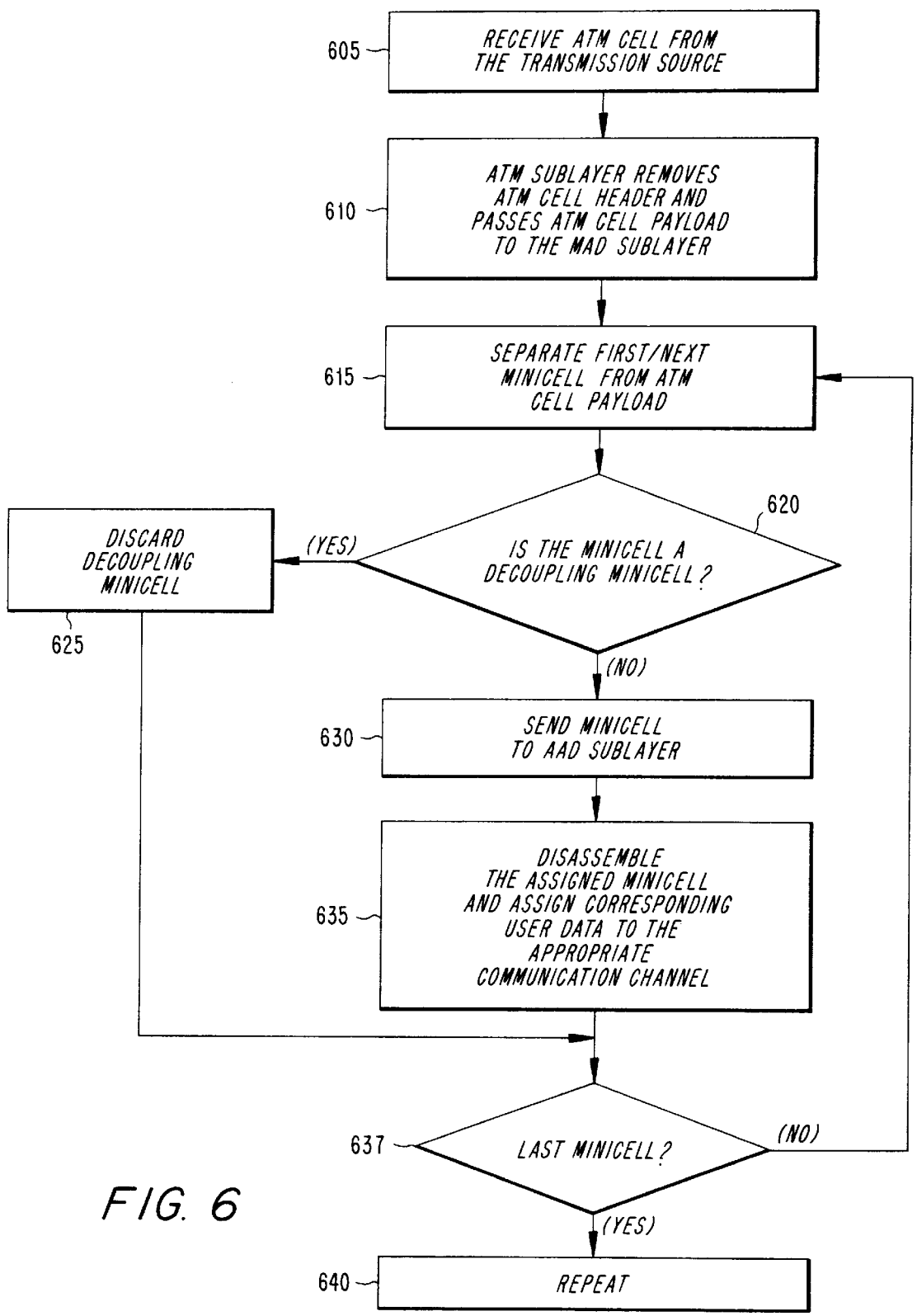
FIG. 6 is a flow chart depicting a method of receiving an ATM cell according to a first embodiment of the present invention.

While the exemplary embodiment described above, provides a method for efficiently preparing and transmitting cellular telecommunication data, FIG. 6 depicts a method for receiving cellular telecommunication data using the same ATM protocol with an improved AALm sublayer. This method will now be described in greater detail hereinbelow.

First, the ATM cell arrives at the receiving entity (e.g., a telecommunication mobile switching center) from a transmission source, as illustrated by block 605. Second, the ATM sublayer 101 removes the ATM cell header and sends the ATM cell payload to the MAD sublayer 103, as illustrated by block 610. The MAD sublayer 103 then separates each minicell, one-by-one, from the ATM cell payload and determines if each minicell is either a decoupling minicell or an assigned minicell. The MAD sublayer 103 makes this determination by detecting the predefined bit pattern associated with decoupling minicells, as mentioned above. This step is illustrated by the combination of blocks 615 and 620. If the next minicell is a decoupling minicell, the minicell is discarded, as illustrated by block 625. If there are additional minicells, as determined by decision block 637, the MAD sublayer 103 separates the next minicell, and determines whether it is a decoupling minicell or an assigned minicell. If the next minicell is an assigned minicell, the MAD sublayer 103 sends the assigned minicell to the AAD sublayer 102, according to block 630. The AAD sublayer then disassembles each assigned minicell and assigns the user data contained therein to the corresponding communication channel, as illustrated by block 635. Since ATM cells are continuously transmitted to the receiving entity in accordance with the ATM protocol, the method described above continually repeats itself as shown by block 640.

Figure 7A:
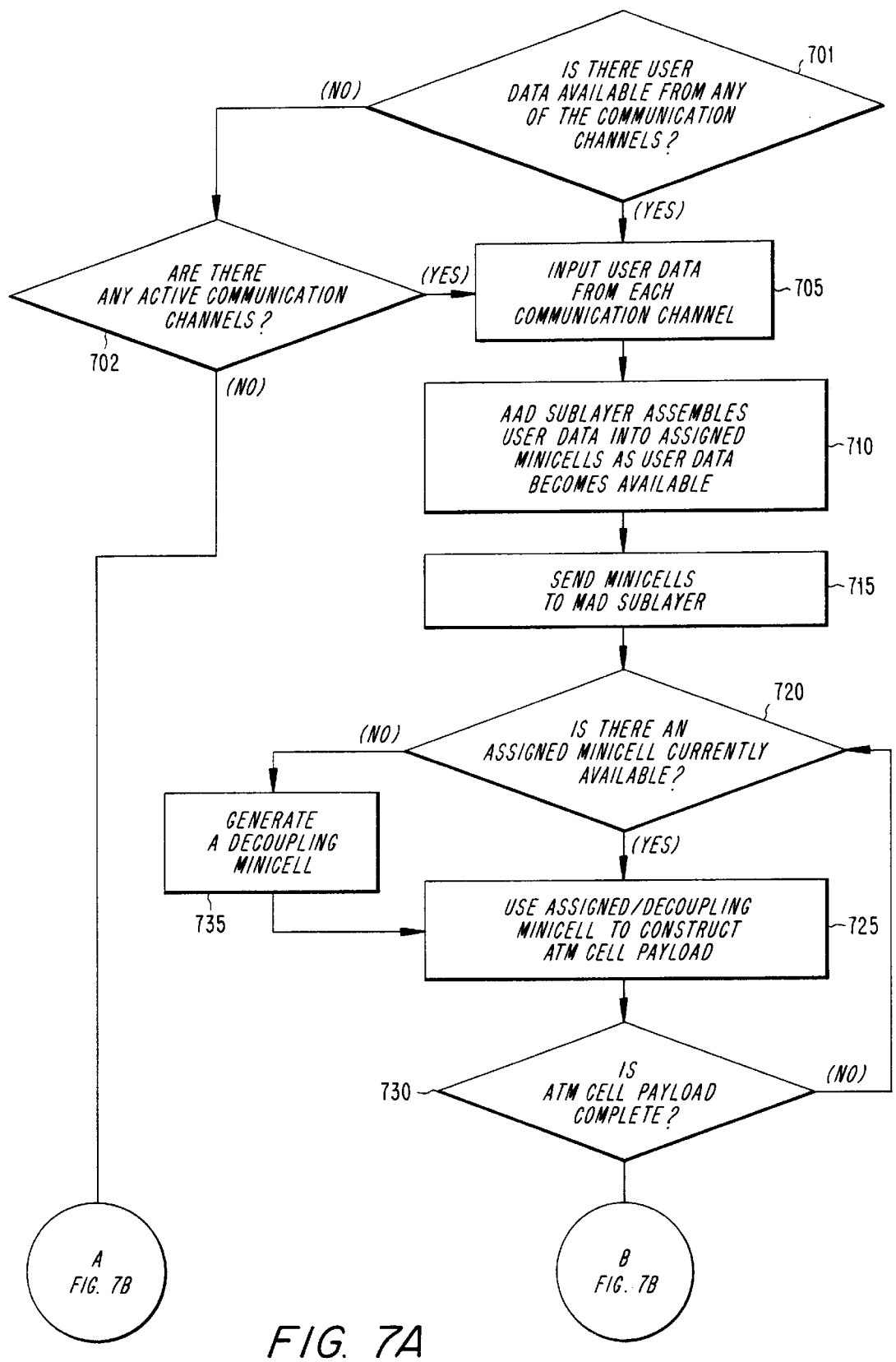
FIGS. 7A and 7B are flow charts depicting a method of constructing and transmitting an ATM cell according to a second embodiment of the present invention.
Figure 7B:
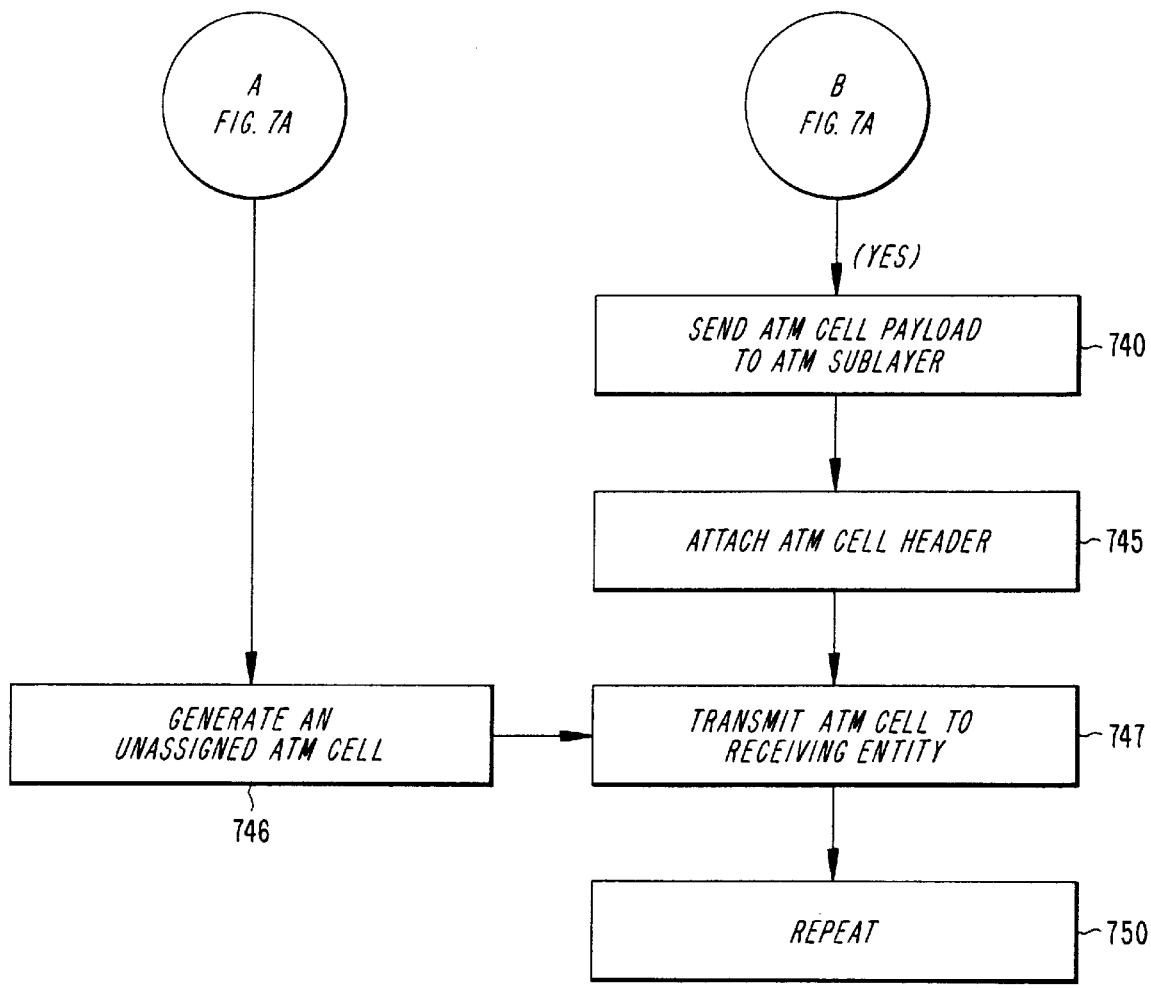

FIGS. 7A and 7B, which will henceforth be referred to collectively as FIG. 7, is a flow chart depicting an alternative embodiment of the present invention. This embodiment also provides a method for efficiently preparing and transmitting cellular telecommunication data. This embodiment is very similar to the exemplary embodiment depicted in FIG. 5. In fact, the method steps of the alternative embodiment corresponding to blocks 705 through 745 are identical to the method steps corresponding to blocks 505 through 545. The difference between the two embodiments is that in accordance with the alternative embodiment, a determination is first made as to whether any data is available from the various communication channels, as illustrated by block 701. If there is user data available, the method of the alternative embodiment proceeds according to blocks 705 through 747 and in the same manner as described above regarding blocks 505 through 545. If there is no user data currently available, a second determination is made as to whether there are any communication channels currently active, as illustrated by block 702. If there are active communication channels, the method of the alternative embodiment also precedes as according to blocks 705 through 745. However, if there are no active communication channels, the ATM layer 101 generates and transmits an unassigned ATM cell, as illustrated by blocks 746 and 747. An unassigned ATM cell does not contain any useful data, nor does it contain any minicells. Instead, unassigned ATM cells merely occupy space in the ATM cell stream in order to maintain the timing and alignment of the ATM cell stream.

The reason for this alternative embodiment is that in some telecommunication systems, there are periods in which there are substantial delays between bursts of user data (i.e., between assigned minicells). For example, if the application is a cellular telephone system, there may be substantial delays between bursts of user data late at night or during the very early morning hours. In fact, there may be periods in which there is no communication activity over any of the communication channels. If this is the case, it may be more efficient to send one or more unassigned ATM cells rather than one or more assigned ATM cells each containing 48 decoupling minicells. No matter which embodiment is employed, the ATM cell stream must be maintained. The alternative embodiment merely provides the option to do so by transmitting a series of unassigned ATM cells or by transmitting a series of ATM cells filled with decoupling minicells.

In yet another alternative embodiment similar to the method illustrated in FIG. 7, the generation of unassigned ATM cells could be triggered by the passage of a predefined period of time, during which, there is no user data available.

As a counterpart to FIG. 7, FIG. 8 depicts an alternative embodiment of a method for receiving telecommunication data that has been prepared when there are substantial delays between bursts of user data and/or no active communication channels. The method for receiving telecommunication data when there are substantial delays between bursts of user data is very similar to the exemplary embodiment depicted in FIG. 6. In fact, the method steps of the alternative embodiment for receiving telecommunication data corresponding to blocks 805, and 810 through 835 are identical to the steps corresponding to blocks 605, and 610 through 635. The difference between the two embodiments for receiving telecommunication data is that after the ATM cell is received by the receiving entity (block 805), the ATM layer 101 in the alternative embodiment first determines whether the ATM cell is unassigned or assigned. This determination is represented by decision block 845. If the ATM cell is unassigned, the ATM layer 101 discards the cell, as illustrated by block 850. If the ATM cell is assigned, the method proceeds in accordance with blocks 810 through 840, and in a manner similar to the previous embodiment.

Figure 9:
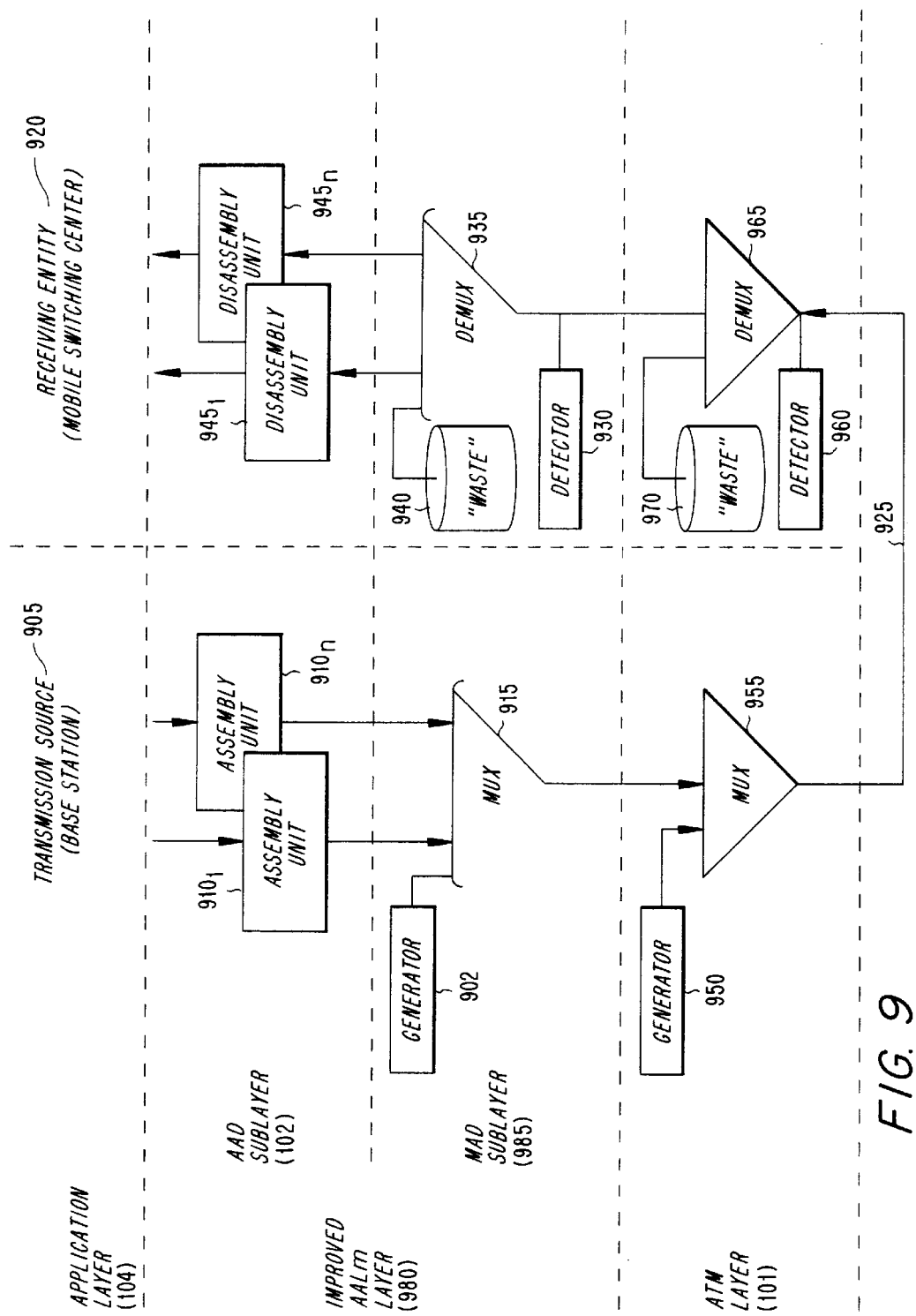
FIG. 9 is a block diagram of an apparatus for constructing, transmitting, and receiving ATM cells according to the various embodiments of the present invention.

FIG. 9 depicts an apparatus that may be used to implement the various methods described above for preparing, transmitting, and receiving telecommunication data. Typically, each cell in a cellular telecommunication system contains at least one base station. Each base station, in turn, maintains one or more receivers for receiving user data (including voice data and other types of related data) from the various communication channels operating in the cell. In general, base stations are well known to those of skill in the art.

In FIG. 9, base station 905 directs the user data from each communication channel 1 . . . n into separate assembly units $910_1$ through $910_n$. Each assembly unit $910_1$ through $910_n$ compresses the user data from the corresponding communication channels 1 . . . n into the payload of individual minicells in accordance with known techniques (not shown). These minicells are referred to above as assigned minicells. The assembly units $910_1$ through $910_n$ then send the minicells to multiplexer 915. Multiplexer 915 then constructs the payload of a current ATM cell by connecting the assigned minicells, back-to-back (not shown). Multiplexer 915 will continue to connect the assigned minicells until the current ATM cell payload is complete or until there is a delay in receiving assigned minicells from the assembly units $910_1$ through $910_n$.

If there is a delay in receiving assigned minicells from the assembly units $910_1$ through $910_n$, multiplexer 915 will instead use decoupling minicells, generated by minicell generator 902, to construct the current ATM cell payload. Multiplexer 915 will continue to multiplex decoupling minicells into the payload of the current ATM cell until the payload is complete or until an assigned minicell from the assembly units $910_1$ through $910_n$ becomes available. Once the ATM cell payload is completely filled, an ATM cell header is attached (not shown) and the ATM cell, header and payload, is transmitted to a receiving entity 920 via transmission link 925. The function of generator 950 and multiplexer 955 will be discussed in detail below.

At the receiving entity 920, the ATM cell header is removed in accordance with known techniques (not shown) and a detector 930 determines whether each minicell is either an assigned minicell or a decoupling minicell. Detector 930 then directs demultiplexer 935 to discard the minicell if detector 930 determines that it is a decoupling minicell, as illustrated by "wastebasket" 940. If detector 930 determines the minicell to be an assigned minicell, demultiplexer 935 sends the minicell to an appropriate one of the disassembly units $945_1$ through $945_n$. The disassembly units $945_1$ through $945_n$ then remove the user data from the minicells and direct the user data to the corresponding communication channel (not shown). The function of detector 960, demultiplexer 965, and "wastebasket" 970 will be discussed in detail below.

In accordance with the method of the alternative embodiment described above, there may be extended periods of time during which there is little or no traffic over any of the communication channels. When this occurs, it may be advantageous to transmit one or more unassigned ATM cells rather than one or more assigned ATM cells each containing 48 decoupling minicells. To implement this alternative embodiment, a generator 950, located in the base station 905, generates unassigned ATM cells when, for example, there is no traffic over any of the communication channels (i.e., no active communication channels). Multiplexer 955 then inserts the unassigned ATM cells into the ATM cell stream, along with any assigned ATM cells.

Likewise, a detector 960 at the receiving entity determines whether the incoming ATM cell is an unassigned ATM cell. If it is an unassigned ATM cell, demultiplexer 965 is directed to discard the cell, as illustrated by "wastebasket" 970. If the ATM cell is an assigned ATM cell, the ATM cell header is removed (not shown) and demultiplexer 965 sends the payload to the detector 930 and demultiplexer 935. Then, the process of separating the minicells from the ATM cell payload and distinguishing between assigned minicells and decoupling minicells proceeds as previously described.

Figure 11:
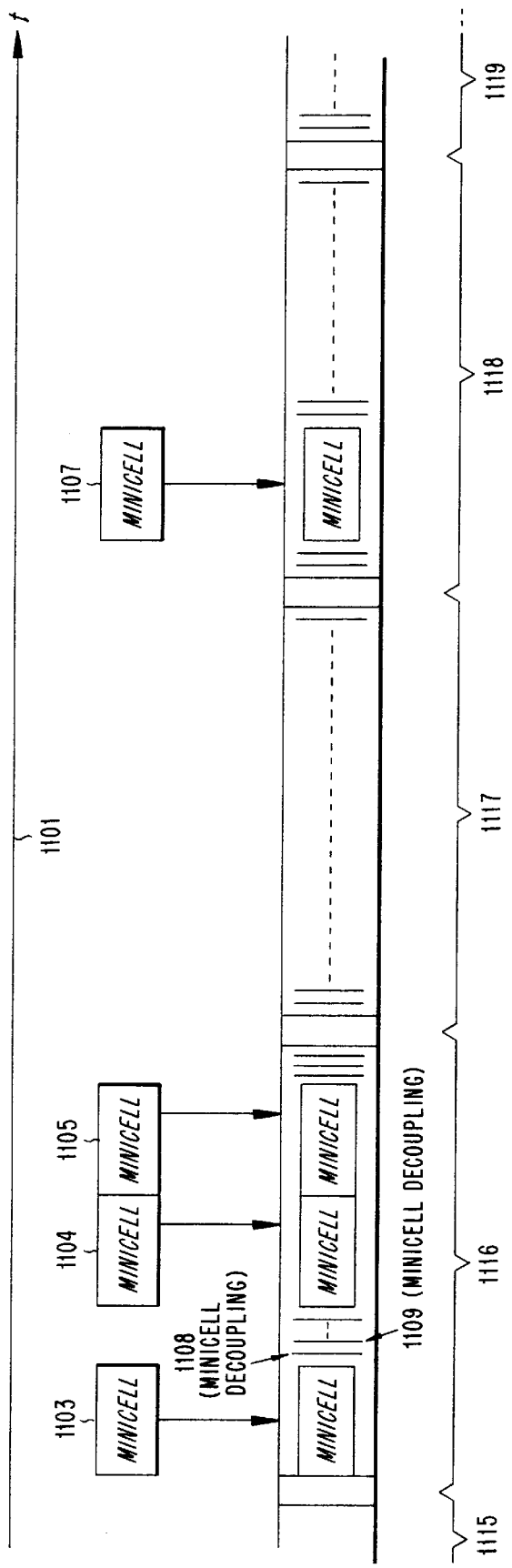
FIG. 11 is a diagram illustrating a stream of ATM cells, as a function of time, constructed the present invention.

Finally, FIG. 11 shows an ATM cell stream as a function of time, wherein ATM with the improved AALm layer 980 of the present invention is employed. In order to better understand the benefit derived by employing the improved AALm sublayer 980 of the present invention, it may be helpful to compare the ATM cell stream depicted in FIG. 11 with the ATM cell stream generated using prior methods as depicted in FIG. 4.

Figure 4:
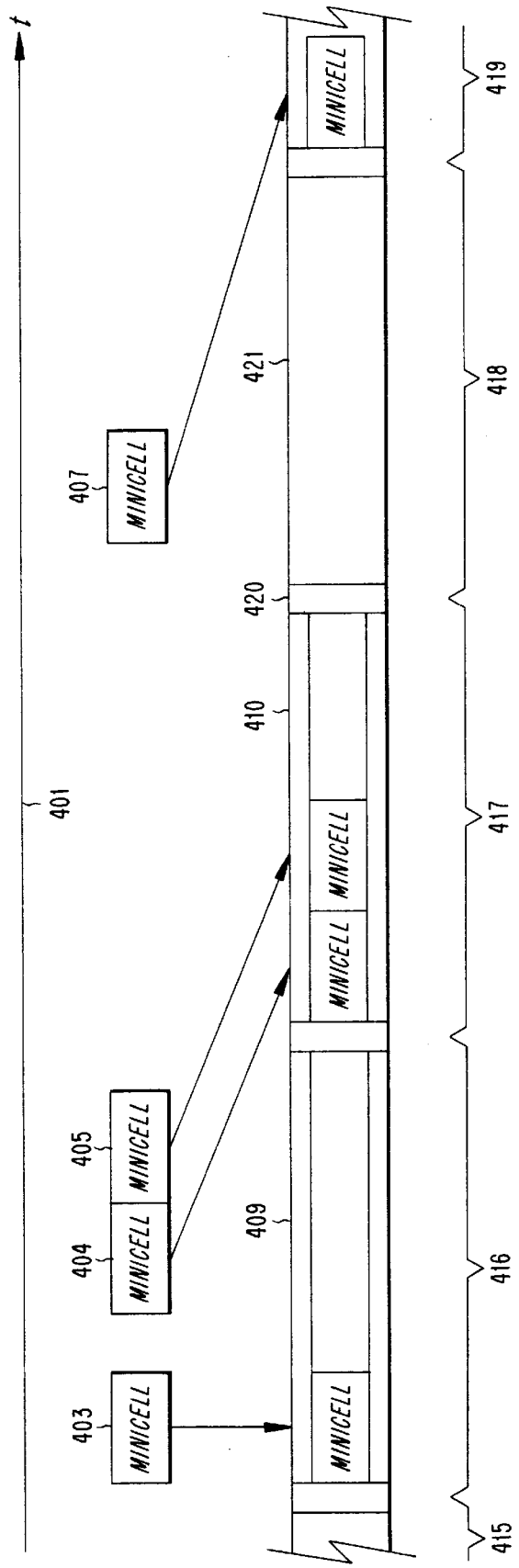
FIG. 4 is a diagram illustrating a stream of ATM cells, as a function of time, constructed using prior methods.

Referring now to both FIGS. 4 and 11, line 1101 represents the passage of time much like line 401. Similarly, assigned minicells 1103, 1104, 1105, and 1107 compare with minicells 403, 404, 405, and 407 respectively, while ATM cells 1115 through 1119 compare with ATM cells 415 through 419 respectively. Also in FIG. 11, the thin vertical lines, for example line 1108, represent decoupling minicells; thus, there are no comparable items in FIG. 4.

When the MAD sublayer 985 begins constructing the payload of ATM cell 1116, there are no assigned minicells available due to the lack of user data after the assembly of assigned minicell 1103. Using the improved AALm layer 980 of the present invention, the MAD sublayer 985 begins constructing the payload of ATM cell 1116 using decoupling minicells, illustrated by minicells 1108 and 1109. The MAD sublayer 985 continues to construct the payload of ATM cell 1116 with decoupling minicells until assigned minicell 1104 becomes available. When assigned minicell 1104 does become available, the MAD sublayer 985 inserts it into the payload of ATM cell 1116 immediately after the preceding decoupling cell. Assigned minicell 1105 is also inserted into the payload of ATM cell 1116 right after assigned minicell 1104 because it too is immediately available.

In contrast, the delay between minicells 403 and 404 forces the prior art MAD sublayer 103 to insert a padding minicell into the remaining portion of the payload of ATM cell 416, as explained above. Again, the prior art MAD sublayer 103 must then wait until the beginning of the next ATM cell 1117 to insert minicells 404 and 405.

One advantage of the present invention is immediately apparent by comparing the delay caused by transmitting minicells 404 and 405 in ATM cell 417 using prior methods and the delay caused by transmitting minicells 1104 and 1105 in ATM cell 1116 using the present invention. The delay in transmitting minicells 1104 and 1105 to a receiving entity using the improved AALm layer 980 of the present invention is substantially less than the delay in transmitting minicells 404 and 405 using prior methods.

The reduction in data transmission delay becomes most evident by contrasting the transmission delay of minicell 407 with the transmission delay of assigned minicell 1107. In FIG. 11, assigned minicell 1107 becomes available just as the MAD sublayer 985 begins constructing the payload for ATM cell 1118. When the improved AALm layer 980 is employed in accordance with the present invention, the MAD sublayer 985 can insert assigned minicell 1107 at the very beginning of the ATM cell 1118 payload. Using the prior method, the insertion of minicell 407 is delayed the length of an entire ATM cell 418. In a telecommunication system operating at 64 kbps, a 53 octet ATM cell (424 bits) takes approximately 7 msec to transmit. If, as is the case with minicell 407, the insertion of a minicell is pushed back the length of almost an entire ATM cell, the resulting transmission delay for that minicell is approximately 7 msec. In contrast, if the insertion of a minicell is pushed back only the length of a one octet decoupling minicell (8 bits), the resulting transmission delay is reduced to approximately 0.1 msec. This represents a significant improvement over prior methods and a significant enhancement in bandwidth utilization when using ATM in low bit rate applications.

In addition to reducing data transmission delays, the improved AALm layer 980 of the present invention also improves bandwidth utilization. This can be illustrated by referring, once again, to FIGS. 4 and 11. In FIG. 4, ATM cell 417 must carry minicells 404 and 405 even though these minicells were available before the previous ATM cell 416 was transmitted to a receiving entity. In contrast, ATM cell 1116, in FIG. 11, carries the comparable assigned minicells 1104 and 1105. This leaves the payload of ATM cell 1117 completely available to carry data from additional minicell channels or ATM channels, thus, improved bandwidth utilization. In prior art methods, additional user data from additional communication channels would simply result in transmission delay times even greater than those illustrated in FIG. 4.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. In a telecommunication system, a method of constructing a data cell which carries user data from a transmission source to a receiving entity comprising the steps of:

generating at least one decoupling minicell if user data is not available, wherein the at least one decoupling minicell has a predetermined length; and constructing the data cell using the at least one decoupling minicell if user data is not available.

2. The method of claim 1 further comprising:

generating an assigned minicell if user data is available; and constructing the data cell using the assigned minicell if user data is available.

3. The method of claim 2, wherein the data cell is an asynchronous transfer mode cell.

4. The method of claim 1, wherein the predetermined length of the decoupling minicell is one octet.

5. In a telecommunication system, a method of generating and transmitting a data cell which carries user data from a transmission source to a receiving entity comprising the steps of:

generating assigned minicells as long as user data is available and making the generated assigned minicells available for inclusion in the data cell;

determining whether one of the assigned minicells is currently available, and if so, then inserting said one of the assigned minicells into the data cell;

generating decoupling minicells and then inserting the decoupling minicells into the data cell in place of assigned minicells if there are no assigned minicells currently available, wherein each decoupling minicell has a predetermined length; and transmitting the data cell when the data cell has been fully constructed.

6. The method of claim 5, further comprising the steps of:

determining whether there are any active communication channels in the telecommunication system; and generating and transmitting at least one unassigned data cell, which contains no minicells, if there are no active communication channels.

7. The method of claim 5, further comprising the steps of:

determining whether a predefined amount of time has elapsed since a last one of the assigned minicells was generated; and generating and transmitting at least one unassigned data cell, which contains no minicells, until a next assigned minicell is generated.

8. The method of claim 5, wherein the data cell is an asynchronous transfer mode cell.

9. The method of claim 5, wherein the predetermined length of each decoupling minicell is one octet.

10. In a telecommunication system, a method for extracting user data from a data cell which carries the user data from a transmission source to a receiving entity comprising the steps of:

separating at least one minicell from the data cell if the data cell is not an unassigned data cell;

determining whether the at least one minicell is a decoupling minicell, wherein the at least one minicell has a predetermined length;

discarding the at least one minicell if the minicell is a decoupling minicell; and removing the user data from the at least one minicell if the minicell is not a decoupling minicell.

11. The method of claim 10, further comprising the steps of:

receiving the data cell from the transmission source; and discarding the data cell if the data cell is an unassigned data cell containing no minicells.

12. The method of claim 11, wherein the data cell is an asynchronous transfer mode cell.

13. The method of claim 11, wherein the predetermined length of the minicell is one octet.

14. In a telecommunication system, an apparatus for constructing a data cell which carries user data from a transmission source to a receiving entity comprising:

means for generating at least one decoupling minicell if user data is not available, wherein the at least one decoupling minicell has a predetermined length; and means for constructing the data cell using the at least one decoupling minicell if user data is not available.

15. The apparatus of claim 14 further comprising:

means for generating an assigned minicell if user data is available; and means for constructing the data cell using the assigned minicell if user data is available.

16. The apparatus of claim 15, wherein the data cell is an asynchronous transfer mode cell.

17. The apparatus of claim 14, wherein the predetermined length of the decoupling minicell is one octet.

18. In a telecommunication system, an apparatus for generating and transmitting a data cell which carries user data from a transmission source to a receiving entity comprising:

means for generating assigned minicells as long as user data is available and making the generated assigned minicells available for inclusion in the data cell;

means for determining whether one of the assigned minicells is currently available, and if so, then inserting said one of the assigned minicells into the data cell;

means for generating decoupling minicells and then inserting the decoupling minicells into the data cell in place of assigned minicells if there are no assigned minicells currently available, wherein each decoupling minicell has a predetermined length; and means for transmitting the data cell when the data cell has been fully constructed.

19. The apparatus of claim 18, further comprising:

means for determining whether there are any active communication channels in the telecommunication system; and means for generating and transmitting at least one unassigned data cell, which contains no minicells, if there are no active communication channels.

20. The apparatus of claim 18, further comprising:

means for determining whether a predefined amount of time has elapsed since a last one of the assigned minicells was generated; and means for generating and transmitting at least one unassigned data cell, which contains no minicells, until a next assigned minicell is generated.

21. The apparatus of claim 18, wherein the data cell is an asynchronous transfer mode cell.

22. The apparatus of claim 18, wherein the predetermined length of each decoupling minicell is one octet.

23. In a telecommunication system, an apparatus for extracting user data from a data cell which carries the user data from a transmission source to a receiving entity comprising:

means for separating at least one minicell from the data cell if the data cell is not an unassigned data cell;

means for determining whether the at least one minicell is a decoupling minicell, wherein the at least one minicell has a predetermined length;

means for discarding the at least one minicell if the minicell is a decoupling minicell; and means for removing the user data from the at least one minicell if the minicell is not a decoupling minicell.

24. The apparatus of claim 23, further comprising:

means for receiving the data cell from the transmission source; and means for discarding the data cell if the data cell is an unassigned data cell containing no minicells.

25. The apparatus of claim 24, wherein the data cell is an asynchronous transfer mode cell.

26. The apparatus of claim 24, wherein the predetermined length of the minicell is one octet.

* * * * *